United States Patent
Jeon et al.

(10) Patent No.: US 8,483,171 B2
(45) Date of Patent: Jul. 9, 2013

(54) METHOD OF ALLOCATING CHANNEL TIME, METHOD OF DETERMINING COMPATIBLE LINKS, AND APPARATUS FOR PROCESSING DATA

(75) Inventors: Beom Jin Jeon, Seoul (KR); Joong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 12/936,111

(22) PCT Filed: Apr. 2, 2009

(86) PCT No.: PCT/KR2009/001695
§ 371 (c)(1),
(2), (4) Date: Dec. 17, 2010

(87) PCT Pub. No.: WO2009/123420
PCT Pub. Date: Oct. 8, 2009

(65) Prior Publication Data
US 2011/0110250 A1    May 12, 2011

Related U.S. Application Data

(60) Provisional application No. 61/041,601, filed on Apr. 2, 2008, provisional application No. 61/050,625, filed on May 6, 2008.

(30) Foreign Application Priority Data

Jun. 16, 2008    (KR) .................. 10-2008-0056318

(51) Int. Cl.
*H04W 4/00*    (2009.01)
(52) U.S. Cl.
USPC .......................................... 370/330; 370/252

(58) Field of Classification Search
None
See application file for complete search history.

(56) References Cited

U.S. PATENT DOCUMENTS

| | | | |
|---|---|---|---|
| 6,967,944 B2 | 11/2005 | Choi | |
| 2005/0141451 A1 | 6/2005 | Yoon et al. | |
| 2006/0040675 A1* | 2/2006 | Halfmann et al. | 455/456.1 |
| 2006/0166683 A1 | 7/2006 | Sharma et al. | |

(Continued)

FOREIGN PATENT DOCUMENTS

| | | |
|---|---|---|
| JP | 2004-530349 A | 9/2004 |
| JP | 2006-25335 A | 1/2010 |
| WO | 2008/026868 A2 | 3/2008 |
| WO | WO 2008/091100 A1 | 7/2008 |

OTHER PUBLICATIONS

Cai et al., "Efficient Resource Management for mmWave WPANs," Wireless Communications and Networking Conference, Mar. 11-15, 2007, Abstract Only.

(Continued)

*Primary Examiner* — Jianye Wu
(74) *Attorney, Agent, or Firm* — Birch, Stewart, Kolasch & Birch, LLP (57) ABSTRACT

A method of searching a compatible beam link is disclosed. The present invention includes receiving a channel time for communicating data from a coordinator, the channel time being previously allocated for communicating data between other stations, determining an occurrence of interference during the allocated channel time, and transmitting a feedback signal to the coordinator, the feedback signal including an interference information indicating an occurrence of interference. According to embodiments of the present invention, stations of network search for compatible beams whenever necessary, whereby loads of energy management and operations of a main station can be reduced.

28 Claims, 5 Drawing Sheets

U.S. PATENT DOCUMENTS

2008/0039046 A1 2/2008 Vilzmann et al.
2009/0233545 A1* 9/2009 Sutskover et al. .............. 455/25

OTHER PUBLICATIONS

Kojima et al., "Necessary Modifications on Conventional IEEE802.15.3b MAC to Achieve IEEE802.15.3c Millimeter Wave WPAN," IEEE 18th International Symposium on Personal, Indoor and Mobile Radio Communications, Sep. 3-7, 2007, Abstract Only.

Liu et al., "Dynamic Channel Selection", IEEE 802.15-06-0227-00-0005, IEEE P802.15 Working Group for Wireless Personal Area Networks (WPANs), May 10, 2006, 25 pages.

* cited by examiner

METHOD OF ALLOCATING CHANNEL TIME, METHOD OF DETERMINING COMPATIBLE LINKS, AND APPARATUS FOR PROCESSING DATA

This application is the National Phase of PCT/KR2009/001695 filed on Apr. 2, 2009, which claims the benefit under 35 U.S.C. 119(e) of U.S. Provisional Application Nos. 61/041,601 and 61/050,625 filed on Apr. 2, 2008 and May 6, 2008 respectively, and claims priority under 35 U.S.C. 119 (a) to patent application Ser. No. 10-2008-0056318 filed in Republic of Korea on Jun. 16, 2008, all of which are hereby expressly incorporated by reference into the present application.

TECHNICAL FIELD

The present invention relates to a method and apparatus for enabling efficient and maximum use of resources when searching and checking a beam link in directional communication.

BACKGROUND ART

At the time this specification was prepared, the technical standard for transferring large-scale data in a wireless home network was being developed by one of the task groups of IEEE 802.15.3c. This standard defines the use of an electric wave having a physical wavelength in the millimeter range for large-scale data transfer (mmWave). In general, this frequency band is an unlicensed band and has been limited to communication service providers, radio astronomy, vehicle collision prevention, and the like.

In IEEE 802.11b or IEEE 802.11g, the carrier frequency is 2.4 GHz and the channel bandwidth is about 20 MHz. In IEEE 802.11a or IEEE 802.11n, the carrier frequency is 5 GHz and the channel bandwidth is about 20 MHz. In contrast, the mmWave standard calls for a carrier frequency of 60 GHz and a channel bandwidth of about 0.5~2.5 GHz. Therefore, the mmWave has a carrier frequency and channel bandwidth considerably greater than those used in the other conventional IEEE 802.11 standards. If a radio frequency signal having a wavelength in the millimeter range is used, it is possible to provide a considerably high data rate on the order of several gigabits (Gbps). It is also possible to implement this using a single chip including an antenna having a size of 1.5 mm or less.

Because the attenuation ratio of air is very high, it is advantageous to reduce inter-station interference. Likewise, in the case of mmWave transmissions, the reaching (i.e., maximum) distance of beam is also decreased due to the high attenuation ratio. Therefore, it is particularly difficult to transmit a signal omni-directionally. In order to solve this problem, a beam needs to be sharpened. In so doing, the beam is locally delivered only (i.e., is limited to a relatively small coverage area).

Because the reaching distance is significantly limited due to the high attenuation ratio and as a result the beam is typically sharpened, another problem arises, that is, communication is not normally performed in a non-line-of-sight environment. Typically, mmWave based systems solves the former problem by using an array antenna having a high gain. Further, mmWave based systems solve the latter problem by using beam steering.

When transmission loss is considerable, in case that limitation is put on transmission power, it is able to secure a specific propagation distance by obtaining an antenna gain using antenna technology. For this, a method of forming and maintaining a beam link is required.

Figure 1:
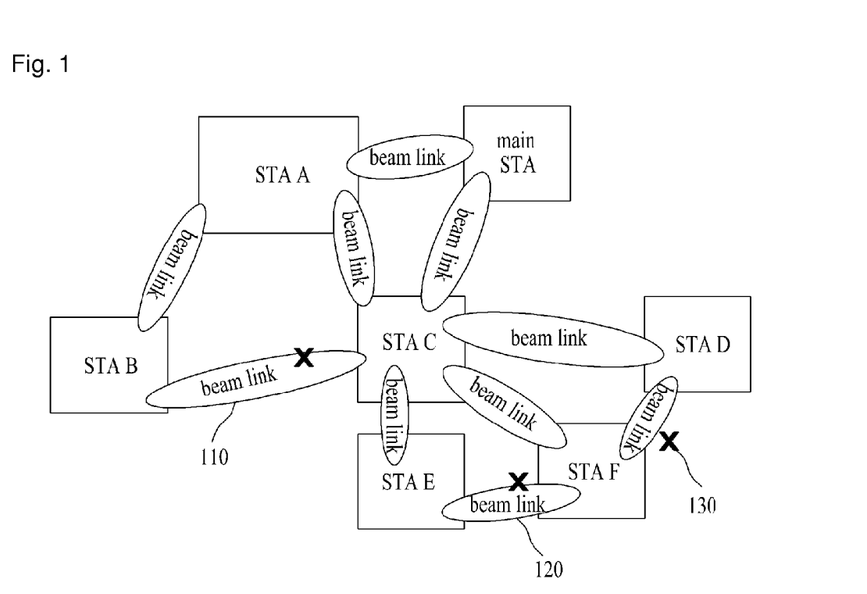
FIG. 1 is a block diagram of an exemplary wireless network to which the present invention is applied.

FIG. 1 is a block diagram of an exemplary radio network to which the present invention applies. The network includes a main station that manages all of the beam links operating in the network. The beam links provide directional communication. As such, these are illustrated in FIG. 1 as ovals.

FIG. 1 shows that certain beam links between two stations are compatible with respect to neighboring stations. Compatibility is determined by checking whether neighboring stations will have a problem with a given beam link. Other beam links, such as beam links 110, 120 and 130 are illustrated as having compatibility problems with one or more neighboring stations. This is indicated by the 'X'.

In order to determine whether a beam link is compatible, all of the stations A to F must check whether the beam link will be compatible and then deliver the check results to the main station.

DISCLOSURE OF INVENTION

Technical Problem

In the above-described network, the main station must manage a significant amount of information, and this imposes a heavy load on the main station. This load on the main station is further evidenced by the fact that all the stations periodically perform this compatibility check and subsequently update the corresponding information by sending the check results to the main station. Furthermore, the overhead is excessive.

Technical Solution

Accordingly, the present invention is directed to a method of allocating a channel, a method of determining whether a link is compatible with neighboring stations and an apparatus for processing data relative to same, where the methods and apparatus substantially obviate one or more of the problems due to the limitations and disadvantages of the related art.

Advantageous Effects

The present invention relates to a method of reducing overhead in the main station when managing beam link information of radio stations and is applicable to radio stations configuring such a communication network having storing directionality as mmWave.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

In the present invention, generally, network stations search for and determine whether they can operate compatibly when other stations are operating when it is necessary to do so. Compared to prior techniques which require periodic compatibility checking, even when unnecessary, the present invention significantly reduces energy management and the operational load of the main station.

An object of the present invention is to provide an apparatus for searching compatible beam links, and a method thereof, by which the overhead associated with the main station, which manages the beam links of a plurality of stations can be reduced.

Additional features and advantages of the invention will be set forth in the description which follows, and in part will be apparent from the description, or may be learned by practicing of the invention. The objectives and other advantages of the invention will be realized and attained by the structure particularly pointed out in the written description and claims thereof as well as the appended drawings.

In accordance with a first embodiment of the present invention, the aforementioned and other objectives are achieved by a method a method for allocating channel time in a wireless network that includes a plurality of stations. The method comprises allocating channel time for at least one of the plurality of stations to transmit a beam for the purpose of determining link compatibility, and then receiving, during the time allocated for determining link compatibility, a feedback signal from at least one of the other plurality of stations, the feedback signal including information indicating whether the beam would interfere with the at least one other station. The method then involves allocating channel time for the at least one station to communicate data based on the feedback signal information.

In accordance with another embodiment of the present invention, the aforementioned and other objectives are achieved by a method for allocating channel time in a wireless network that includes a plurality of stations, where the method comprises receiving, from a first one of the plurality of stations, a request for channel time to communicate data with another one of the plurality of stations, determining whether there is sufficient time available for the first station to communicate data with the other station and transmitting, to the first station, a request to determine link compatibility if it is determined that there is not sufficient time for the first station to communicate data with the other station. Then, the method involves allocating channel time for the first station to transmit a beam for the purpose of determining link compatibility, receiving, from a second station, during the channel time allocated for the first station to determine link compatibility, a feedback signal including information indicating whether the beam would interfere with the second station; and allocating channel time for the first station to communicate data with the other station based on the feedback signal.

In accordance with yet another embodiment of the present invention, the aforementioned and other objectives are achieved by a method for determining link compatibility in a wireless network that includes a plurality of stations. The method involves determining, during time allocated for determining link compatibility, whether a beam transmitted by a first station would cause interference with data communication, and transmitting a feedback signal including interference information, the interference information being based on the determination whether the beam would cause interference.

In accordance with still another embodiment of the present invention, the aforementioned and other objectives are achieved by a method for determining link compatibility amongst a plurality of stations in a wireless network. The method involves exchanging checking signals amongst the plurality of stations during a channel time allocated for determining link compatibility, determining whether any one or more checking signals would cause interference, and transmitting a feedback signal from at least one of the plurality of stations to a coordinator, wherein the feedback signal contains interference information based on the determination whether any one or more checking signals would cause interference.

In accordance with a further embodiment of the present invention, the aforementioned and other objectives are achieved by a method for determining link compatibility in a wireless network including a plurality of stations. The method of this embodiment involves requesting channel time for communicating data with a first one of the plurality of stations; receiving a request to determine link compatibility if it has been determined that there is insufficient time for communicating data with the first one of the plurality of stations; and receiving channel time allocated for determining link compatibility. The method then involves transmitting a beam, during the channel time allocated for determining link compatibility, for the purpose of permitting a neighboring station to determine whether the beam would interfere with the ability of the neighboring station to communicate data.

In accordance with still a further embodiment of the present invention, the aforementioned and other objectives are achieved by an apparatus for processing data in a wireless network comprising a plurality of stations. The apparatus comprises a communication module configured to receive data from the plurality of stations, and to transmit data to the plurality of stations. The apparatus also includes a controller configured to allocate channel time for at least one of the plurality of stations to transmit a beam for the purpose of determining link compatibility, to receive a feedback signal from another one of the plurality of stations, where the feedback signal includes interference information indicating whether the beam would interfere with the other station, and to allocate channel time to the at least one of the plurality of stations for communicating data based on the feedback signal.

In yet a further embodiment of the present invention, the aforementioned and other objectives are achieved by an apparatus for processing data in a wireless network comprising a plurality of stations, where the apparatus comprises a communication module configured to transmit data to at least one of the plurality of stations and a coordinator, and configured to receive data from at least one of the plurality of stations and a coordinator. The apparatus also comprises a controller configured to detect the presence of an interfering signal from one of the plurality of stations during a channel time allocated for determining link compatibility, and to transmit a feedback signal to the coordinator through the communication module, the feedback signal including interference information indicating whether the interference signal was detected during the channel time allocated for determining link compatibility.

It is to be understood that both the foregoing general description and the following detailed description are exemplary and explanatory and are intended to provide further explanation of the invention as claimed.

Mode for the Invention

Reference will now be made in detail to the preferred embodiments of the present invention, examples of which are illustrated in the accompanying drawings.

First of all, the following exemplary embodiments of the present invention can be modified into various forms and the scope of the present invention including the appended claims and their equivalents is not limited to the following embodiments.

Figure 2:
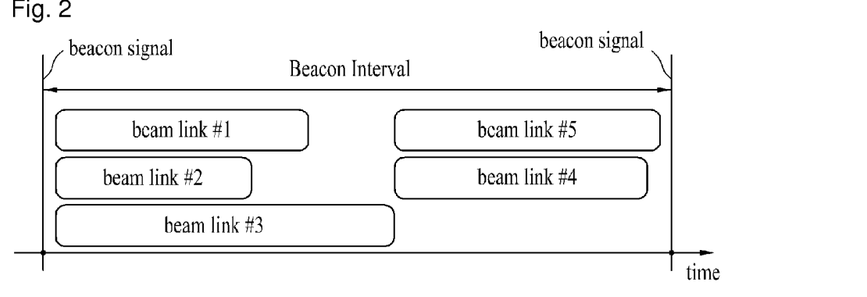
FIG. 2 is a diagram illustrating the scheduling of channels for five exemplary beam links.

FIG. 2 is a diagram illustrating a process for scheduling channel time for compatibility checking beam links.

Ordinarily, when a network is configured, every station on the network checks whether compatibility exists between the various beam links. The stations then forward the corresponding information to the main station. The main station maintains the forwarded information.

Assuming there are five beam links in the network as illustrated in FIG. 2. Then FIG. 2 illustrates, by way of example, scheduling channel times for the five beam links within a beacon interval to perform a compatibility check and report the results to the main station. In this case, beacon interval means an interval between a beacon signal and a next beacon signal or an interval between a beacon period and a next beacon period.

The main station must store all of the reported information. Yet, if the main station has to maintain all of this information for all of the stations excessive overhead may result. In order to reduce the overhead on the main station, it is preferable that each station be enabled to check the compatible beam link if necessary.

Figure 3:
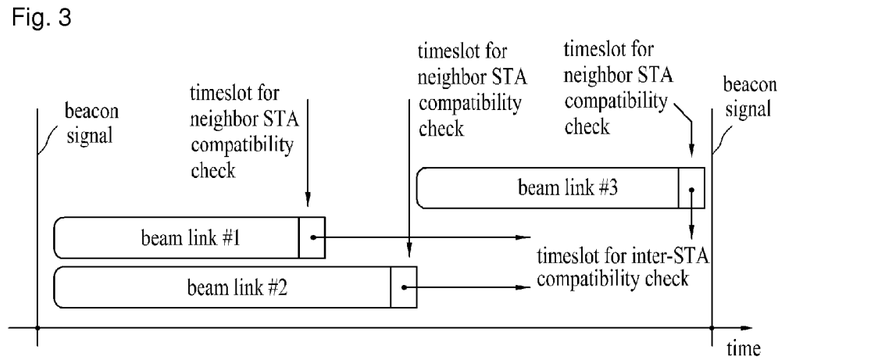
FIG. 3 is a diagram illustrating the scheduling of timeslots for checking compatibility for three exemplary beam links according to one embodiment of the present invention.

FIG. 3 is a diagram illustrating a process for scheduling a timeslot for performing a compatibility check for a number of beam links according to one exemplary embodiment of the present invention. Referring to FIG. 3, a timeslot is allocated to a neighboring station(s) to perform and report the results of a compatibility check. Thus, for example, stations neighboring the stations associated with beam link #1 will participate in a compatibility check during the allocated timeslot associated with beam link #1. Similarly, stations neighboring the stations associated with beam links #2 and #3, respectively, will participate in corresponding compatibility checks during the allocated timeslots associated with beam links #2 and #3.

For example, in the allocated timeslot associated with beam link #1, the stations configuring beam link #1 stop their communication and enter a listen mode. The neighboring stations then transfer data in order to check whether beam link #1 is compatible. The transferred data may include a check signal generated for the purpose of performing a compatibility check and it may identify the specific station from which the data was transferred.

If one of the stations in listen mode detects a signal carrying the transferred data from a neighboring station, it can be confirmed that there exists another station that will cause interference with beam link #1. If a signal carrying the transferred data from the neighboring station is not detected, it can be confirmed that the neighboring station will not cause interference with beam link #1. In the latter case, the main station determines that beam link #1 can be maintained when the neighboring station transmits a signal such as the aforementioned signal carrying the transferred data. Meanwhile, as long as a specific beam is maintained, it is able to allocate listening times to neighboring stations, respectively.

Figure 4:
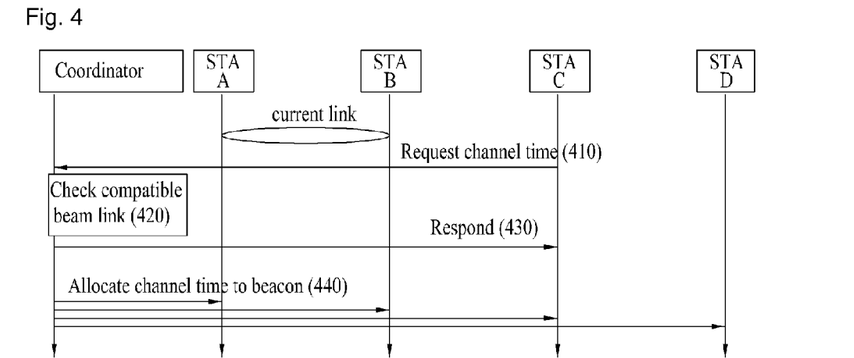
FIG. 4 is a diagram illustrating the process of requesting and performing a compatibility check between beam links using a coordinator.

FIG. 4 is a diagram illustrating a compatibility check between beam links using a coordinator. Referring to FIG. 4, a coordinator maintains and manages compatible beam link information. Thus if a specific station makes a request for channel time, the coordinator may allocate the channel time according to whether a beam link of the specific station is or will be a compatible link.

For example, in FIG. 4, station A and a station B are already communicating via an existing beam link. If a specific station, such as station C, makes a request for channel time to the coordinator [410], the coordinator determines, from the compatible beam link information that it maintains whether there is any compatibility concerns with respect to beam links that may be formed between other stations [420]. The coordinator then replies to station C [430], allocates information on station scheduling, including channel times allocated to stations C and D, and then transmits the information using beacon [440].

The coordinator obtains compatibility and/or incompatibility information for various beam links associated with the stations on the network. It also periodically updates the compatibility and/or incompatibility information. Assuming, for example, that the number of stations existing on the network is 'n', then there exists n×(n−1) possible links. If there are five stations, the number of possible links is 20 (5×4). It is, therefore, necessary to check for the compatibility between a specific link and each of the remaining 19 links. Therefore, 380 (20×19) compatibility checks need to be performed.

Figure 5:
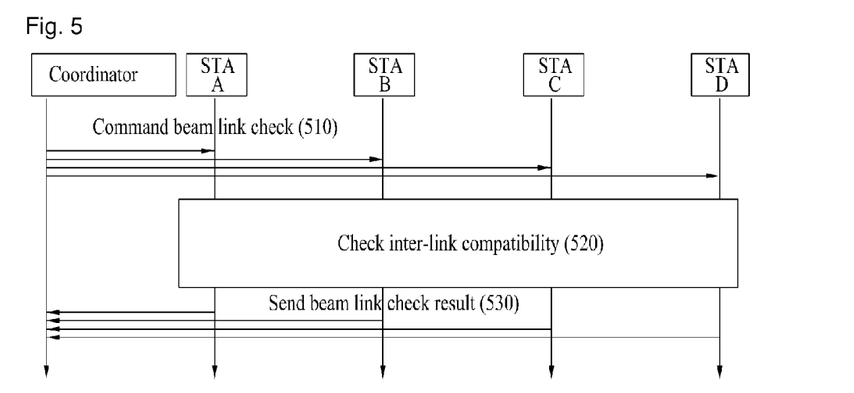
FIG. 5 is a diagram illustrating the process of performing a compatibility check between beam links in each station.

FIG. 5 is a diagram illustrating compatibility checks between beam links at each station. Referring to FIG. 5, if the coordinator transmits a beam link check command to all stations [510], each of the stations STA A to STA D performs an inter-beam link compatibility check [520] and then feeds back the corresponding result to the coordinator [530]. The process shown in FIG. 5 is generally executed when the network is initially configured or when the network is reset. Thereafter, the coordinator checks the compatibility between beam links if a station makes a request. The coordinator then allocates channel time based on the compatibility information stored therein.

Figure 6:
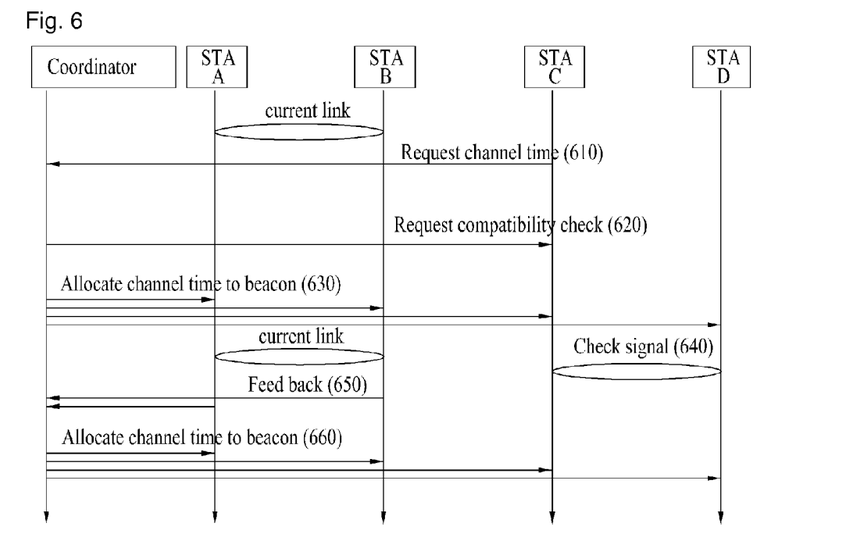
FIG. 6 is a diagram illustrating the process of performing a compatibility check for terminals, which have formed beam links as in FIG. 3.

FIG. 6 is a diagram illustrating a process of performing compatibility checks in a timeslot. Referring to FIG. 6, station C makes a request for channel time [610]. However, if there is no sufficient channel time to allocate to station C, the coordinator makes a request that a compatibility check be performed between beam links.

Subsequently, the coordinator allocates channel time within a beacon interval [630]. During the allocated time, stations (e.g., station C) attempting to form a new link (e.g., with station D) transmit check a signal [640], while other stations (e.g., stations A and B), which already have an established link, enter a listen mode. Each of the stations (e.g., stations A and B) which are in listen-mode, checks whether they can detect the check signal [640]. If they cannot detect the check signal [640]. If they cannot detect the check signal

[640] there is compatibility and the station s in listen-mode report the corresponding results to the coordinator [650].

Accordingly, only those stations that currently have an existing beam link and those stations attempting to form a new link join the compatibility check. This can substantially reduce the number of beam link checks that must be performed and the amount of information that is sent to and stored at the coordinator.

Finally, the coordinator allocates channel time, for example, to the stations (STA C and D) forming a new link based on the compatibility check results that were fed back to the coordinator [660].

Figure 7:
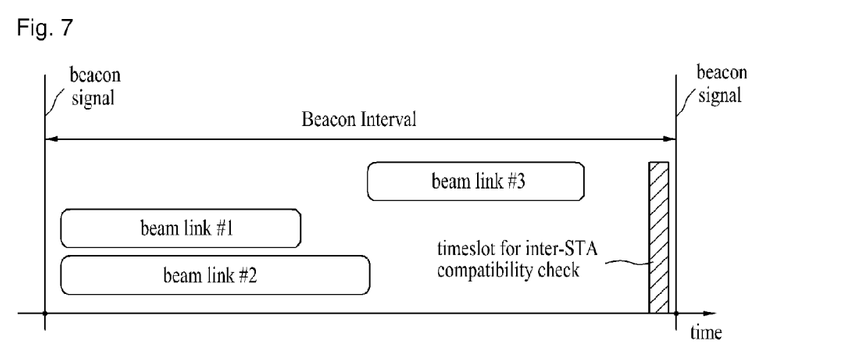
FIG. 7 is a diagram illustrating the scheduling of a timeslot for compatibility checking for three exemplary beam links according to another exemplary embodiment of the present invention.

FIG. 7 is a diagram illustrating the scheduling of timeslot for the purpose of performing a compatibility check in accordance with another embodiment of the present invention. Referring to FIG. 7, a common timeslot, which does not correspond to a specific channel time, can be allocated for enabling neighbor stations to check whether a corresponding beam link would be a compatible beam link.

Thus, in the timeslot illustrated in FIG. 7, stations having already formed a beam link enter a listen-mode. Neighboring stations can then transfer data to check whether a corresponding beam link would be compatible with an existing beam link. The transferred data may include a check signal generated specifically for purposes of performing a compatibility check from a specific station. If so, it is able to check compatibility with all previous beam links at once.

Figure 8:
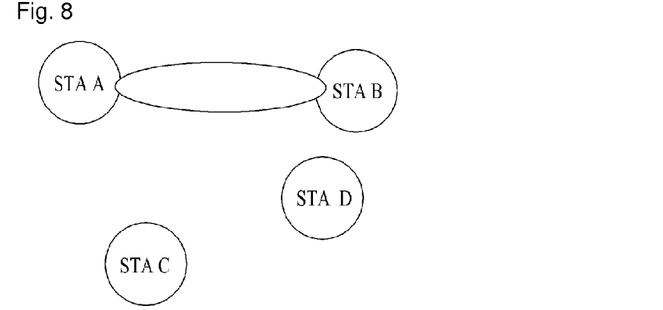
FIGS. 8 to 10 are diagrams illustrating the process of forming a new compatible beam link in addition to a previously established beam link.
Figure 9:
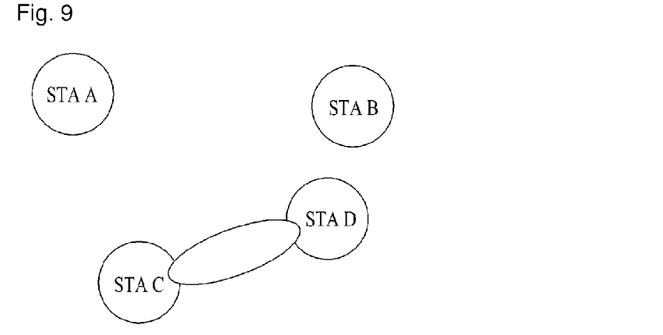
Figure 10:
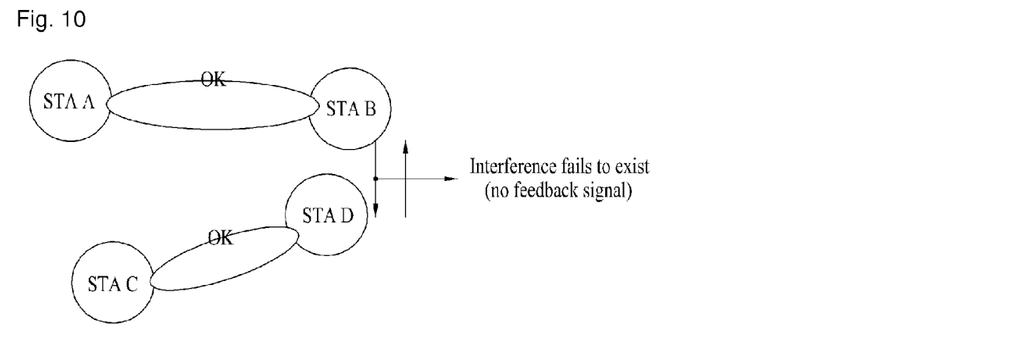

FIGS. 8 to 10 are diagrams which together illustrate a process for forming a new compatible beam link in addition to a previously established beam link. Referring to FIG. 8, station A and station B establish a beam link. If a channel is entirely occupied by stations A and B, station C and station D are unable to access the channel to establish a beam link. Therefore, a timeslot is defined to check whether a compatible beam link can be formed between stations C and D.

Referring now to FIG. 9, if the channel time associated with station A and station B shown in FIG. 8 expires, stations A and B stop communication and enter a mode for receiving a signal from an external station. Stations C and D then initiate a beam link there between while stations A and B perform reception.

Referring to FIG. 10, if stations C and D do not create interference for stations A and B, stations C and D can establish a compatible beam link.

Figure 11:
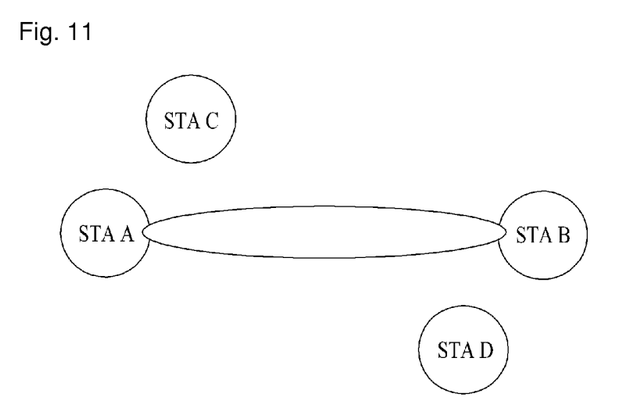
FIGS. 11 to 13 are diagrams illustrating the process of feeding back compatibility check results when there is interference between beam links.
Figure 12:
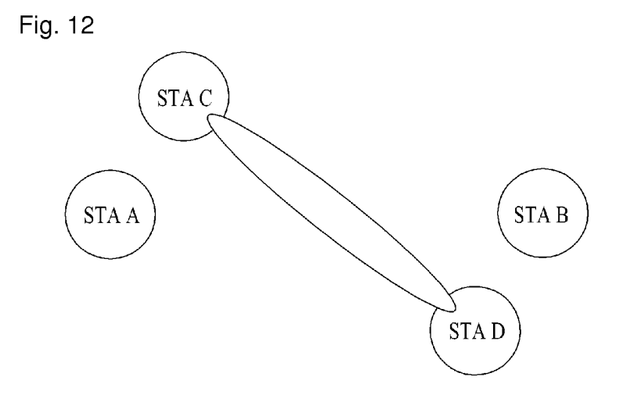
Figure 13:
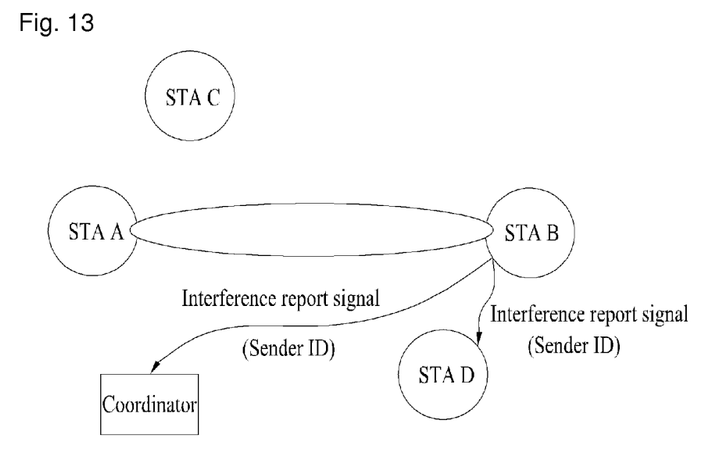

FIGS. 11 to 13 are diagrams which together illustrate a process for feeding back compatibility check results when it is determined that interference exists between beam links. Referring first to FIG. 11, stations A and B have already established and are maintaining a beam link there between. If stations A and B continue to occupy the channel, stations C and D are unable to perform communication on that channel. Accordingly, a timeslot is allocated to check whether a beam link between stations C and D would be problematic for stations A and B.

Referring now to FIG. 12, stations A and B listen without performing communication. Stations C and D perform communication with each other, as shown. If stations A and/or B detect a transmission signal between stations C and D, it can be established that a beam link has been already established.

Referring to FIG. 13, station B then makes a report to the coordinator to inform the coordinator that a beam link between station C and D is not compatible and should not be established. Accordingly, station B reports that the beam link between stations A and B would be interfered with.

In these exemplary embodiments, the coordinator receives the interference reports. However a correspondent station, such as the station D, station C or the like may serve the same function.

The interference report signal may include a sending station identifier (sender ID). In this case, the sender ID identifies the station receiving interference. In the example of FIG. 13, the station receiving interference is station B. In addition, the identifier may include a physical address (i.e., PHY address), a MAC address or the like.

When there are at least two stations sending check signals in a timeslot allocated for compatibility checking, the stations can be scheduled to send check signals at a predetermined time. Alternatively, each of the stations may be enabled to randomly send a check signal in accordance with a 'listen after talk' technique.

Figure 14:
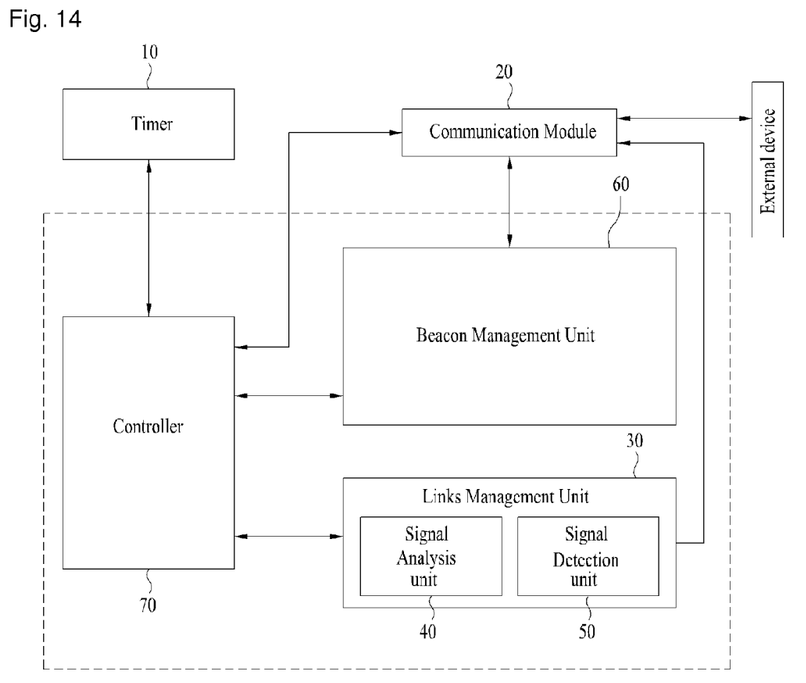
FIG. 14 is a block diagram of a coordinator according to one exemplary embodiment of the present invention.

FIG. 14 is a block diagram illustrating a coordinator according to one exemplary embodiment of the present invention. Referring to FIG. 14, the coordinator may include a timer 10, a communication module 20, a link management unit 30, a beacon management unit 60 and a controller 70.

The purpose of timer 10 is to indicate the start and end of each beacon interval, that is, the interval between a beacon signal and a next beacon signal, or an interval between a beacon period and a next beacon period. The timer 10 is also capable of providing timing information during a bacon interval. For instance, the timer 10 is able to announce a timing point of a beacon period for transmitting a beacon signal within a beacon interval.

The communication module 20 plays the role of transmitting data (i.e., a signal) to a station. The communication module 20 also plays the role of receiving data (i.e., a data signal) transmitted by the station. If the coordinator attempts to transmit or receive data, the corresponding signal should pass through the communication module 20.

The link management unit 30 may include a signal analysis unit 40 and a signal detection unit 50. The signal detection unit 50 plays the role of detecting and receiving a feedback signal among the signals received via the communication module 20. As explained above, the feedback signal is a signal used for reporting compatibility checking results. The signal analysis unit 40 analyzes the feedback signal(s) detected by the signal detection unit 50 and determines whether a compatible beam link exists between the stations.

The beacon management unit 60 transmits a beacon signal via the communication module 20. The beacon management unit 60 also manages information or data carried over the beacon signal, e.g., channel time information for data transfer and the like. According to one embodiment of the present invention, in order to determine whether a compatible beam link exists, channel time allocation information, for checking interference between stations, may be included in a beacon signal.

The controller 70 is able to control channel time allocation for inter-station data communication. The controller 70 uses the feedback signal(s) detected and analyzed by the link management unit 30. The controller 70 controls the beacon management unit 60, such that the beacon management unit 60 generates a beacon signal including a channel time allocations for inter-station data communication. The controller 70 also controls the beacon signal so that it is transmitted via the communication module 20.

While the controller 70, the link management unit 30 and the beacon management unit 60 are described above according to their respective roles, it is understood that the controller 70 can take on the role of the link management unit 30 and/or the beacon management unit 60.

Figure 15:
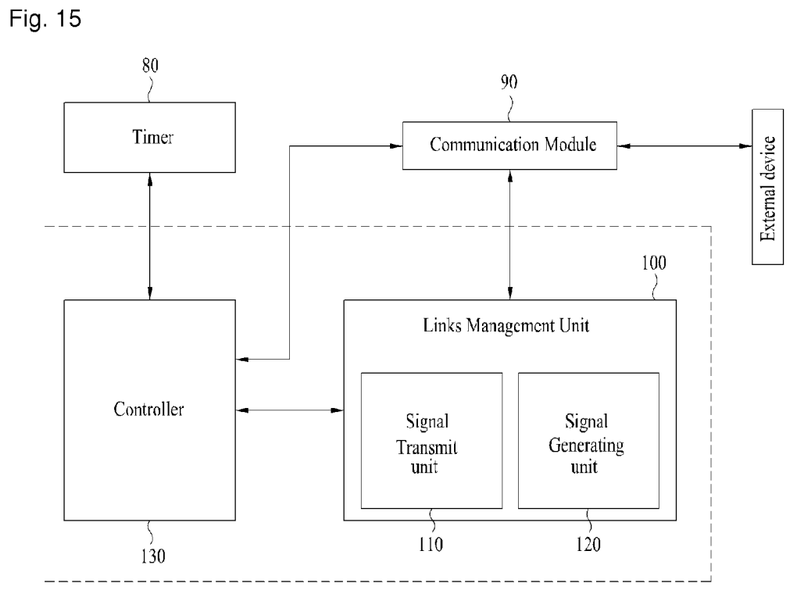
FIG. 15 is a block diagram of a station according to one exemplary embodiment of the present invention.

FIG. 15 is a block diagram illustrating a station according to one exemplary embodiment of the present invention. Referring to FIG. 15, a station may include a timer 80, a communication module 90, a controller 130 and a link management unit 100.

Like the timer 10 of the above-described coordinator, the timer 80 plays the role of indicating a start and end time for a beacon interval, thus indicating the interval between a beacon signal and a next beacon signal, or an interval between a beacon period and a next beacon period. For instance, the timer is able to indicate a timing point of a channel time allocated for checking the compatibility of a beam link by the coordinator.

The communication module 90 transmits data (i.e., data signal) to another station or to the coordinator. The communication module 90 receives data transmitted by another station or the coordinator.

The link management unit 100 may include a signal transmit unit 110 and a signal generating unit 120. The signal generating unit 120 generates a check signal for performing an inter-beam link compatibility check between stations. The signal transmit unit 110 transmits the check signal generated by the signal generating unit 120 via the communication module 70.

The controller 130 controls the signal generating unit 120 in order to generate a check signal for checking a compatible beam link. The controller 130 controls the signal transmit unit 110 in order to transmit a check signal to another station via the communication module 90 at the channel time allocated by the coordinator to determine a compatible beam link. In case of receiving a check signal from another station, the controller 130 determines whether there is any interference based on the received check signal. The controller 130 is also able to control a corresponding feedback signal to be transmitted to the coordinator.

In this disclosure of the present invention, roles of the controller 130 and the links management unit 100 are separately described. However, it is understood that the controller 130 can plays a role as the link management unit 100 as well.
Industrial Applicability Accordingly, the present invention relates to a method of reducing overhead in the main station when managing beam link information of radio stations and is applicable to radio stations configuring such a communication network having storing directionality as mmWave.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for allocating channel time in a wireless network that includes a plurality of stations, the method comprising:
   allocating channel time for at least one of the plurality of stations to transmit a beam for the purpose of determining link compatibility;
   receiving, during the time allocated for determining link compatibility, a feedback signal from at least one of the other plurality of stations, the feedback signal including information indicating whether the beam would interfere with the at least one other station; and
   allocating channel time for the at least one station to communicate data based on the feedback signal information.

2. The method of claim 1, further comprising:
   transmitting a beacon signal to the plurality of stations, the beacon signal including information allocating the channel time for determining link compatibility.

3. The method of claim 1, wherein the information further includes an identifier identifying the at least one other station.

4. The method of claim 1, wherein a coordinator receives feedback signal and allocates the channel times.

5. A method for allocating channel time in a wireless network that includes a plurality of stations, the method comprising:
   receiving, from a first one of the plurality of stations, a request for channel time to communicate data with another one of the plurality of stations;
   determining whether there is sufficient time available for the first station to communicate data with the other station;
   transmitting, to the first station, a request to determine link compatibility if it is determined that there is not sufficient time for the first station to communicate data with the other station;
   allocating channel time for the first station to transmit a beam for the purpose of determining link compatibility;
   receiving, from a second station, during the channel time allocated for the first station to determine link compatibility, a feedback signal including information indicating whether the beam would interfere with the second station; and
   allocating channel time for the first station to communicate data with the other station based on the feedback signal.

6. The method of claim 5, wherein the first and second stations are neighboring stations.

7. The method of claim 5, wherein the channel time allocated for the first station to determine link compatibility is related in time to channel time allocated for the second station to communicate data.

8. The method of claim 7, wherein the channel time allocated for the first station to determine link compatibility is a timeslot following the channel time allocated for the second station to communicate data.

9. The method of claim 5, wherein a coordinator receives the request from the first station, determines whether there is sufficient time for the first station to communicate data, transmits a request to the first station to determine link compatibility, receives the feedback signal and allocates times for determining link compatibility and for communicating data.

10. The method of claim 5, further comprising:
    transmitting a beacon signal, the beacon signal including information conveying the allocated channel time for the first station to transmit a beam for the purpose of determining link compatibility.

11. A method for determining link compatibility in a wireless network that includes a plurality of stations, the method comprising:
    determining, during time allocated for determining link compatibility, whether a beam transmitted by a first station would cause interference with data communication; and
    transmitting a feedback signal including interference information, the interference information being based on the determination whether the beam would cause interference.

12. The method of claim 11, further comprising:
    prior to determining whether the beam transmitted by the first station would cause interference, communicating data with a second station during a channel time allocated for communicating data.

13. The method of claim 12, further comprising:
terminating the data communication with the second station; and
entering a mode that permits the detection of the beam during the channel time allocated for determining link compatibility.

14. The method of claim 11, wherein the allocated channel time for determining link compatibility is transmitted on a beacon signal from a coordinator.

15. The method of claim 11, wherein the feedback signal includes an identifier.

16. The method of claim 15, wherein the identifier identifies the station transmitting the feedback signal.

17. The method of claim 15, wherein the identifier identifies the station that would experience interference if the first station transmits data.

18. The method of claim 11 further comprising:
transmitting the feedback signal to stations associated with interference.

19. A method for determining link compatibility amongst a plurality of stations in a wireless network, the method comprising:
exchanging checking signals amongst the plurality of stations during a channel time allocated for determining link compatibility;
determining whether any one or more checking signals would cause interference; and
transmitting a feedback signal from at least one of the plurality of stations to a coordinator, wherein the feedback signal contains interference information based on the determination whether any one or more checking signals would cause interference.

20. The method of claim 19, further comprising:
receiving, from the coordinator, channel time allocated for communicating data with another one of the plurality of stations; and
communicating data with the other one of the plurality of stations during the allocated channel time for communicating data.

21. The method of claim 19, wherein information conveying the channel time allocation for determining link compatibility is transmitted on a beacon signal from the coordinator.

22. The method of claim 21, wherein the channel time allocated for determining link compatibility amongst the plurality of stations is a timeslot between two consecutive beacon signals.

23. A method for determining link compatibility in a wireless network including a plurality of stations, the method comprising:
requesting channel time for communicating data with a first one of the plurality of stations;
receiving a request to determine link compatibility if it has been determined that there is insufficient time for communicating data with the first one of the plurality of stations;
receiving channel time allocated for determining link compatibility; and
transmitting a beam, during the channel time allocated for determining link compatibility, for the purpose of permitting a neighboring station to determine whether the beam would interfere with the ability of the neighboring station to communicate data.

24. The method of claim 23, further comprising:
receiving channel time allocated for communicating data with the first one of the plurality of stations; and
transmitting a signal, during the channel time allocated for communicating data, to the first one of the plurality of stations, the signal conveying communication data.

25. The method of claim 23, further comprising:
receiving a beacon signal conveying the channel time allocated for determining link compatibility.

26. The method of claim 25, wherein the beacon signal is received from a coordinator.

27. An apparatus for processing data in a wireless network comprising a plurality of stations, the apparatus comprising:
a communication module configured to receive data from the plurality of stations, and to transmit data to the plurality of stations; and
a controller configured to allocate channel time for at least one of the plurality of stations to transmit a beam for the purpose of determining link compatibility, to receive a feedback signal from another one of the plurality of stations, wherein the feedback signal includes interference information indicating whether the beam would interfere with the other station, and to allocate channel time to the at least one of the plurality of stations for communicating data based on the feedback signal.

28. An apparatus for processing data in a wireless network comprising a plurality of stations, the apparatus comprising:
a communication module configured to transmit data to at least one of the plurality of stations and a coordinator, and configured to receive data from at least one of the plurality of stations and a coordinator; and
a controller configured to detect the presence of an interfering signal from one of the plurality of stations during a channel time allocated for determining link compatibility, and to transmit a feedback signal to the coordinator through the communication module, the feedback signal including interference information indicating whether the interference signal was detected during the channel time allocated for determining link compatibility.

* * * * *